US006566935B1

United States Patent
Renous

(10) Patent No.: US 6,566,935 B1
(45) Date of Patent: May 20, 2003

(54) POWER SUPPLY CIRCUIT WITH A VOLTAGE SELECTOR

(75) Inventor: Claude Renous, Grenoble (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/649,901

(22) Filed: Aug. 28, 2000

(30) Foreign Application Priority Data

Aug. 31, 1999 (FR) .......................................... 99 11033

(51) Int. Cl.[7] .......................................... H02J 1/10

(52) U.S. Cl. .......................... 327/408; 327/530; 307/80; 307/126

(58) Field of Search .......................... 327/407, 408, 327/530, 546; 307/64, 80, 87, 126, 130

(56) References Cited

U.S. PATENT DOCUMENTS 4,341,961 A * 7/1982 Komoriya .............. 365/189.03
4,617,473 A 10/1986 Bingham ...................... 307/66
4,654,829 A * 3/1987 Jiang et al. ............ 365/189.03
5,157,291 A 10/1992 Shimoda ..................... 327/408
5,187,396 A * 2/1993 Armstrong, II et al. ...... 327/65
5,336,945 A * 8/1994 Ikeda ......................... 327/293
5,341,034 A 8/1994 Matthews ................... 327/534
5,446,397 A * 8/1995 Yotuyanagi .................. 327/66
5,550,494 A 8/1996 Sawada ....................... 327/69
5,748,033 A 5/1998 Kaveh et al. ............... 327/545
RE36,179 E 4/1999 Shimoda ..................... 327/407
6,002,295 A 12/1999 Gens et al. ................. 327/546
6,040,718 A * 3/2000 Henry ........................ 327/407

* cited by examiner

*Primary Examiner*—Terry D. Cunningham
(74) *Attorney, Agent, or Firm*—Wolf, Greenfield & Sacks, P.C.; James H. Morris

(57) ABSTRACT

A power supply circuit receiving several supply voltages on respective switches, at least one of the switches being a first PMOS transistor connected between one of the supply voltages and a common output terminal, this switch being associated with a second PMOS transistor connected between the gate of the first transistor and a power supply node maintained at the highest of the other supply voltages, with a third NMOS transistor, which is less conductive in the on state than the second transistor, connected between the gate of the first transistor and the ground, and with a fourth PMOS transistor having its source connected to the power supply line of the switch and its drain connected to ground via a current source, and to the gates of the second, third, and fourth transistors.

17 Claims, 3 Drawing Sheets

POWER SUPPLY CIRCUIT WITH A VOLTAGE SELECTOR

BACKGROUND OF THE INVENTION

1. Field of the Invention

The present invention relates to power supply circuits, and especially to power supply circuits that receive several supply voltages and that select the highest supply voltage. Such power supply circuits are used, for example, in a rechargeable battery device for supplying the device from the battery or from an external power source, if any.

2. Discussion of the Related Art

FIG. 1 shows a conventional power supply circuit receiving two supply voltages V1 and V2 on two respective supply lines L1 and L2, and providing a voltage Vdd on an output node S. The two supply lines are connected to the output node by two P-channel MOS transistors (PMOS), respectively T1 and T2. A comparator A1 has two inputs respectively connected to the two supply lines so that the output of comparator A1 is at a low level when voltage V1 is greater than voltage V2 and at a high level otherwise. The output of comparator A1 is directly connected to the gate of transistor T1, and is connected to the gate of transistor T2 via an inverter I1.

Such power supply circuits are used when it is desired to obtain a small voltage drop between voltage V1 or V2 and voltage Vdd. In the cases where a high voltage drop can be tolerated, diodes are used instead of transistors T1 and T2.

FIG. 2A shows the variation of gate voltages VGI and VG2 of transistors TI and T2 for an example of relative variation of supply voltages V1 and V2. Voltage V1 remains constant while voltage V2 crosses voltage V1 as it decreases, then as it increases. It is assumed that comparator A1 and inverter I1 are both supplied between voltage Vdd and the ground.

When voltage V2 exceeds voltage V1 by a threshold ΔV characteristic of comparator A1, voltage VA1 provided by the comparator is equal to voltage Vdd. Thus, gates G1 and G2 are respectively at voltage Vdd and at ground. As a result, transistor T2 conducts and transistor T1 is off, transistor T2 transmitting voltage V2 on output node S. Similarly, when voltage V2 is smaller than voltage V1 by threshold ΔV, voltage VA1 provided by the comparator is at ground, whereby transistor T2 is off and transistor T1 is on, transistor T1 transmitting voltage V1 on output node S.

Range ±ΔV is a range in which the comparator, which is by nature imperfect, behaves linearly. The comparator behaves linearly between times t1 and t2 when voltage V2 progressively decreases from voltage V1+ΔV to voltage V1−ΔV and voltage VG1 progressively decreases from voltage Vdd to the ground.

Inverter I1 includes a PMOS transistor and an N-channel MOS transistor (NMOS). The threshold voltage of the PMOS transistor of inverter I1 is called VTH, which voltage is also that of PMOS transistors T1 and T2. Similarly, the threshold voltage of the NMOS transistor is called VTL.

At a time t3, voltage VG1 is equal to voltage Vdd−VTH, and at a time t4, voltage VG1 reaches voltage VTL. Gate voltage VG2, at the output of inverter I1, progressively varies between a zero level at time t3 and a level Vdd at time t4.

Transistor T1 starts conducting when its gate voltage VG1 reaches voltage Vdd−VTH, that is, at time t3.

At a time t5, gate voltage VG2 reaches voltage Vdd−VTH. Transistor T2 stops conducting at time t5.

Thus, there is a range of simultaneous conduction (CS) of transistors T1 and T2 between times t3 and t5. There is a similar range of simultaneous conduction CS on either side of a time tr when voltage V2 becomes greater than voltage V1 again.

During a simultaneous conduction, the power supply sources generating voltages V1 and V2 are shorted, which is not desirable. Further, if the power supply source providing the highest supply voltage exhibits a high impedance, the shorting of the power supply sources results in a drop of the highest supply voltage to the level of the other supply voltage, and comparator A1 can no longer determine which of the supply voltages is greater. The power supply selection circuit is then blocked in an intermediary state and no longer properly ensures its function.

On the other hand, the principle used in the circuit of FIG. 1 does not enable selecting the highest of three supply voltages or more.

SUMMARY OF THE INVENTION

An object of the present invention is to provide a circuit for selecting the highest of two supply voltages or more, which can operate without short-circuiting power supply lines.

To achieve this object, as well as others, the present invention provides a power supply circuit receiving several supply voltages on respective power supply lines, each of which is connected to a respective switch, at least one of the switches being a first MOS transistor of a first conductivity type, connected between the associated power supply line and a common output terminal, which includes, for said at least one switch: a second transistor, of the first conductivity type, connected between the gate of the first transistor and a power supply node maintained at the highest of the other supply voltages, a third transistor, of a second conductivity type, which is less conductive in the on state than the second transistor, connected between the gate of the first transistor and a reference potential, and a fourth transistor, of the first conductivity type, having its source connected to the power supply line associated with the switch and its drain connected to the reference potential via a current source, and to the gates of the second, third, and fourth transistors.

According to an embodiment of the present invention, said current source is a fifth transistor, of the second conductivity type, having its gate connected to said power supply node.

According to an embodiment of the present invention, the power supply circuit includes two power supply lines and two respective switches, the power supply node associated with a switch being directly connected to the power supply line associated with the other switch.

According to an embodiment of the present invention, the power supply circuit includes three power supply lines, a sixth transistor connected between the third power supply line and the power supply node, and having its gate connected to the second power supply line, and a seventh transistor connected between the second power supply line and the power supply node and having its gate connected to the third power supply line.

According to an embodiment of the present invention, at least one of the switches is a diode.

According to an embodiment of the present invention, the second transistor has a width-to-length ratio of 20/2, and the third transistor has a W/L ratio of 3/25.

According to an embodiment of the present invention, the fourth transistor has a W/L ratio of 40/2, and the fifth transistor has a W/L ratio of 3/50.

According to an embodiment of the present invention, the first and second conductivity types respectively are P and N.

The foregoing objects, features and advantages of the present invention, will be discussed in detail in the following non-limiting description of specific embodiments in connection with the accompanying drawings.

DETAILED DESCRIPTION

According to the present invention, a distinct comparator is used to control each of transistors T1 and T2, the characteristics of each of the comparators being chosen to eliminate the range of simultaneous conduction.

Figure 1:
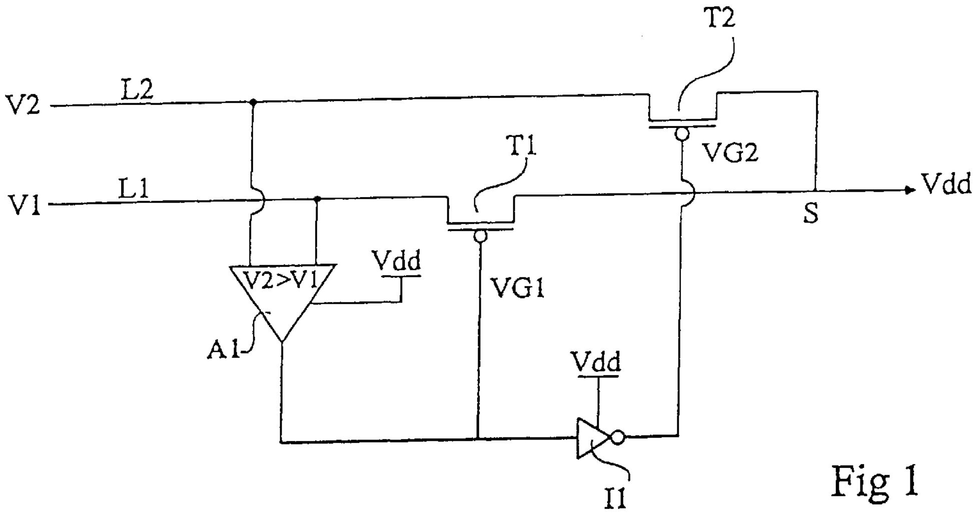
FIG. 1, previously described, schematically shows a voltage selection power supply circuit according to prior art.
Figure 3:
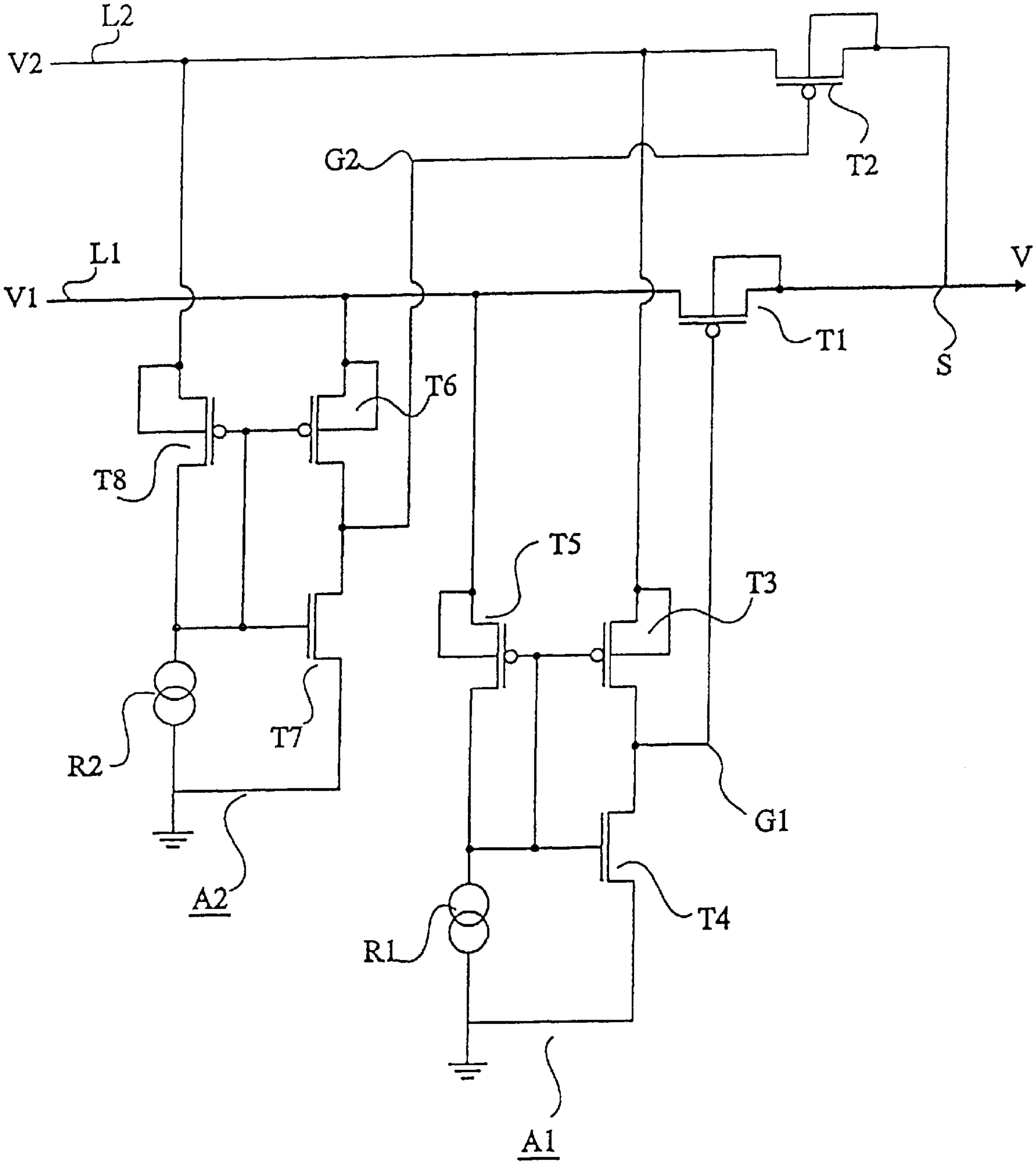
FIG. 3 schematically shows an embodiment of a power supply circuit according to the present invention.

FIG. 3 shows a power supply circuit according to the present invention, receiving two supply voltages V1 and V2 on two respective power supply lines L1 and L2. The power supply lines are, as in FIG. 1, respectively connected to an output node S by PMOS transistors T1 and T2. Transistors T1 and T2 are controlled by two respective comparators A1 and A2 of specific structure. Comparator A1 includes a PMOS transistor T3 having its source connected to line L2, and having its drain, which forms the comparator output, connected to gate G1. The drain of an NMOS transistor T4 is connected to gate G1 and its source is connected to a reference potential, here the ground. The gates of transistors T3 and T4 are connected to the drain and to the gate of a diode-connected PMOS transistor T5 having its source connected to line L1 and its drain connected to the ground via a current source R1.

Comparator A2 associated with transistor T2 includes transistors T6, T7, and T8 and a current source R2, which are respectively homologous to transistors T3, T4, and T5 and to current source R1. The sources of transistors T6 and T8 are respectively connected to lines L1 and L2, that is, in an inverted way as compared to the connection of their homologous transistors T3 and T5.

Assuming, as a first approximation, that transistor T4 behaves as a current source similar to current source R1, comparator A1 behaves as a conventional comparator of source-input type. Thus, when voltage V2 is greater than voltage V1, the output of comparator A1 is brought to a voltage close to voltage V2 and transistor T1 is open. In the opposite case, the comparator output is brought to a voltage close to ground and transistor T1 is on. Comparator A2 has a homologous operation.

According to this approximation, however, when V1=V2, the current balance in transistors T3 and T5 is such that the comparator output is brought to a voltage ranging between the ground and V1 or V2. Transistors T1 and T2 are then not really off, and there is a simultaneous conduction.

According to the present invention, transistor T4 is provided to be less conductive than transistor T3, especially when V1=V2. Then, when V1=V2, transistor T3 tends to provide a higher current than that that transistor T4 tends to absorb. As a result, the comparator output is brought towards potential V2 and transistor T1 turns off. Of course, the comparator output must be capable of being grounded when V1>V2, and thus, transistor T4 must be capable of becoming more conductive than transistor T3. For this purpose, the gate of transistor T4 is connected to the drain of transistor T5, whereby transistor T4 becomes more conductive as voltage V1 increases. It should be noted that, according to an alternative embodiment, the gate of transistor T4 may be connected to the source of transistor T5.

A solution to obtain a transistor T4 with the desired characteristics is to lengthen its gate with respect to the gate of transistor T3. A transistor T4 having a gate with a width-to-length ratio (W/L) of 3/25 may for example be used while transistor T3 has a gate with a W/L ratio of 20/2.

Transistor T7 of comparator A2 has the same features as transistor T4, so that the operation of comparator A2 is analogous to that of comparator A1.

Thus, according to the present invention, transistors T1 and T2 are both off when voltages V1 and V2 are equal and there is no simultaneous conduction.

The present invention may also be adapted to a power supply circuit receiving more than two power supply voltages.

Figure 4:
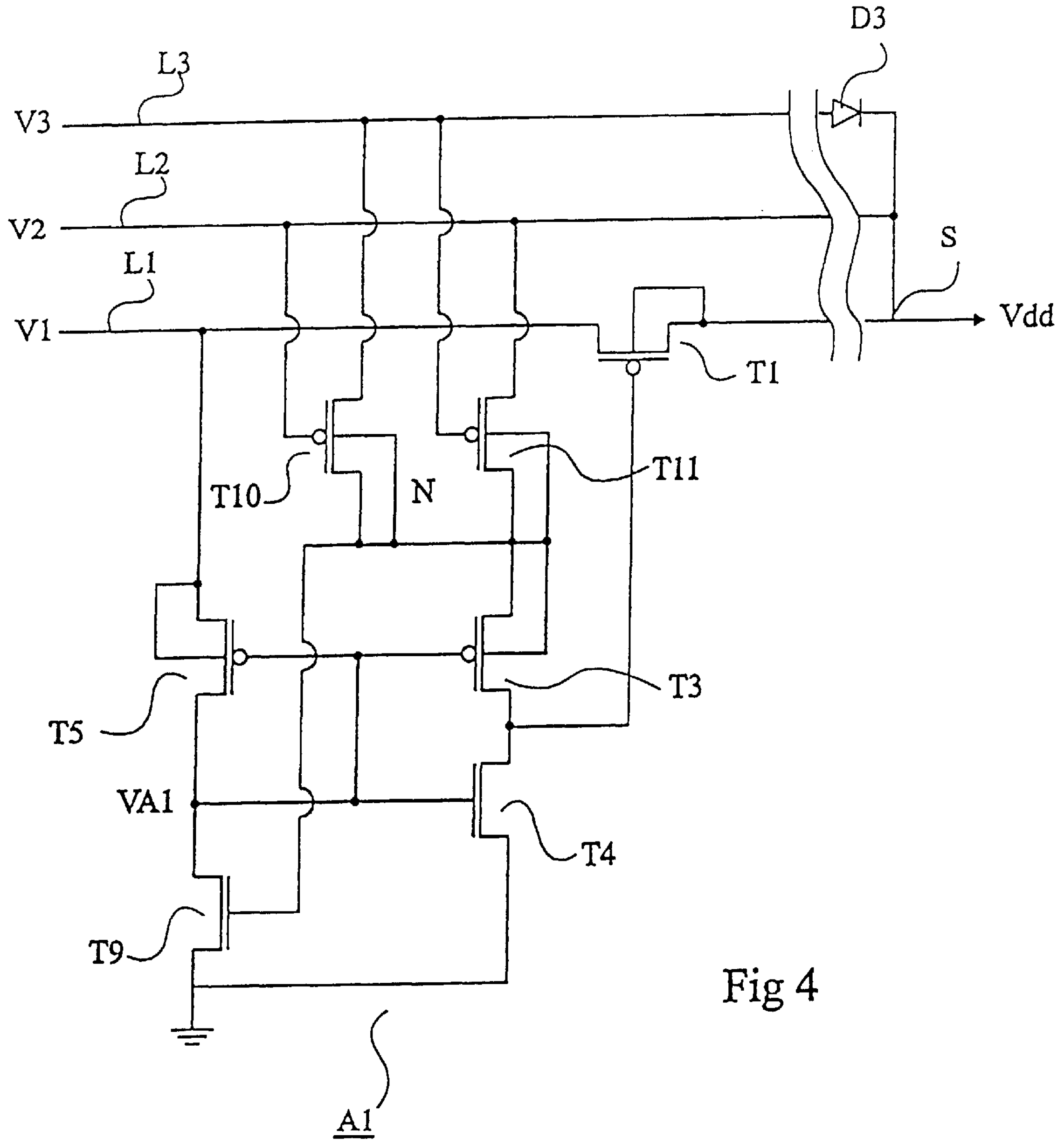
FIG. 4 schematically shows a second embodiment of a power supply circuit according to the present invention.

FIG. 4 schematically shows a circuit receiving three voltages V1, V2, and V3 respectively on three power supply lines L1, L2, and L3. Line L1 is connected to terminal S by a PMOS transistor T1 controlled by a comparator A1 such as that in FIG. 3, connected to compare voltage V1 with a voltage VN present on a node N. Node N is connected to lines L3 and L2 by two respective PMOS transistors T10 and T11 having their gates respectively connected to lines L2 and L3. With this configuration, node N receives the higher of voltages V2 and V3. To avoid that a simultaneous conduction of transistors T10 and T11 causes the previously mentioned problems, the latter are chosen to be significantly resistive. For clarity, only comparator A1 has been shown in FIG. 4. Two homologous comparators A2 and A3 may be connected to control two transistors T2 and T3 on lines L2 and L3.

The operation of comparator A1 is substantially the same as that described in relation with FIG. 3. According to whether voltage V1 is smaller or greater than voltage VN, transistor T1 is off or on. Similarly, when voltage V1 is equal to voltage VN, transistor T1 is off to avoid any simultaneous conduction with possible transistors homologous to transistor T1 on lines L2 and L3.

As shown, current source R1 of FIG. 3 here is replaced by an NMOS transistor T9 having its gate controlled by voltage VN. This enables decreasing the current consumption of comparator A1. If voltage V1 is the maximum voltage, voltages V2 and V3 (and thus VN) are annulled in practice, which turns off transistor T4 and thus annuls the current flowing therethrough, which is not the case with a conventional current source R1 such as a resistor.

It should be noted that transistor T9 conducts a current of the same order as the current flowing through transistor T4. As an example, using the previously-mentioned W/L ratios, the gate of transistor T9 will preferably have a W/L ratio of 3/50.

Of course, the present invention is likely to have various alterations, modifications, and improvements which will readily occur to those skilled in the art. In particular, if one of the supply voltages is relatively high as compared to the voltage drop in a diode, the transistor connecting this supply voltage to output terminal S may be replaced with a diode such as diode D3 shown in FIG. 4.

A power supply circuit receiving three supply voltages has been described in FIG. 4, but those skilled in the art will easily adapt the present invention to a power supply circuit receiving more than three supply voltages.

Finally, power supply circuits receiving positive supply voltages, in which the power supply lines are connected to the output terminal by PMOS transistors, have been described in the present application. Those skilled in the art will easily adapt the present invention to a power supply circuit receiving negative supply voltages, in which the power supply lines are connected to the output terminal by NMOS transistors. In this case, the PMOS and NMOS transistors of FIGS. 3 and 4 will be replaced with transistors of opposite type.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A power supply circuit receiving several supply voltages on respective power supply lines, comprising:

switches, wherein each of the respective power supply lines is connected to a respective switch, at least one of the switches including:

a first transistor of a first conductivity type connected between an associated power supply line and a common output terminal;

a second transistor of the first conductivity type connected between a gate of the first transistor and a power supply node maintained at a highest of the other supply voltages;

a third transistor of a second conductivity type which is less conductive in an on state than the second transistor, connected between the gate of the first transistor and a reference potential; and a fourth transistor of the first conductivity type having a source terminal connected to the associated power supply line, and a drain terminal connected to the reference potential via a current source, and to a gate of the second transistor, a gate of the third transistor and a gate of the fourth transistor.

2. The power supply circuit of claim 1, wherein the current source is a fifth transistor of the second conductivity type, having a gate connected to the power supply node maintained at the highest of the other supply voltages.

3. The power supply circuit of claim 1, including two power supply lines and two respective switches, the power supply node maintained at the highest of the other supply voltages associated with the at least one of the switches being directly connected to a power supply line associated with the other switch.

4. The power supply circuit of claim 1, wherein the respective power supply lines comprise a first power supply line, a second power supply line, and a third power supply line and the at least one switch further includes:

a sixth transistor connected between the third power supply line and the power supply node, and having a gate connected to the second power supply line; and a seventh transistor connected between the second power supply line and the power supply node and having a gate connected to the third power supply line.

5. The power supply circuit of claim 1, wherein at least one of the remaining switches is a diode.

6. The power supply circuit of claim 1, wherein:

the second transistor has a width-to-length ratio (W/L) of 20/2, and the third transistor has a W/L ratio of 3/25.

7. The power supply circuit of claim 6, wherein:

the fourth transistor has a W/L ratio of 40/2, and the fifth transistor has a W/I ratio of 3/50.

8. The power supply circuit of claim 1, wherein the first and second conductivity types respectively are P and N.

9. The power supply circuit of claim 1, wherein the first transistor is a MOS transistor.

10. A power supply circuit receiving several supply voltages on respective power supply lines, comprising:

a number of switches, each power supply line being connected to a respective switch, at least one of the switches including:

a first transistor connected between a respective power supply line and a common output terminal of the power supply circuit and having a first terminal;

a second transistor connected between the first terminal of the first transistor and a power supply node maintained at a highest of the other supply voltages and having a second terminal;

a third transistor connected between the first terminal of the first transistor and a reference potential and having a third terminal; and a fourth transistor having a fourth terminal, a fifth terminal and a sixth terminal, wherein the fourth terminal is connected to the respective power supply line and the fifth terminal is connected to the reference potential via a current source and to the second terminal, the third terminal and the sixth terminal.

11. The power supply circuit of claim 10, wherein the current source is a fifth transistor of the second conductivity type, having a seventh terminal connected to the power supply node maintained at the highest of the other supply voltages.

12. The power supply circuit of claim 10, including two power supply lines and two respective switches, the power supply node associated with a switch being directly connected to the power supply line associated with the other switch.

13. The power supply circuit of claim 10, wherein the respective power supply lines comprise a first power supply line, a second power supply line, and a third power supply line and the at least one switch further includes:

a sixth transistor connected between the third power supply line and the power supply node, and having an eighth terminal connected to the second power supply line; and a seventh transistor connected between the second power supply line and the power supply node and having a ninth terminal connected to the third power supply line.

14. The power supply circuit of claim 10, wherein at least one of the remaining switches is a diode.

15. The power supply circuit of claim 10, wherein the third transistor is less conductive in an on state than the second transistor.

16. The power supply circuit of claim 10, wherein:

the second transistor has a width-to-length ratio of 20/2, and the third transistor has a width-to-length ratio of 3/25.

17. The power supply circuit of claim 16, wherein:

the fourth transistor has a width-to-length ratio of 40/2, and the fifth transistor has a width-to-length ratio of 3/50.

* * * * *

UNITED STATES PATENT AND TRADEMARK OFFICE

CERTIFICATE OF CORRECTION

PATENT NO. : 6,566,935 B1
DATED : May 20, 2003
INVENTOR(S) : Claude Renous

Figure 2:
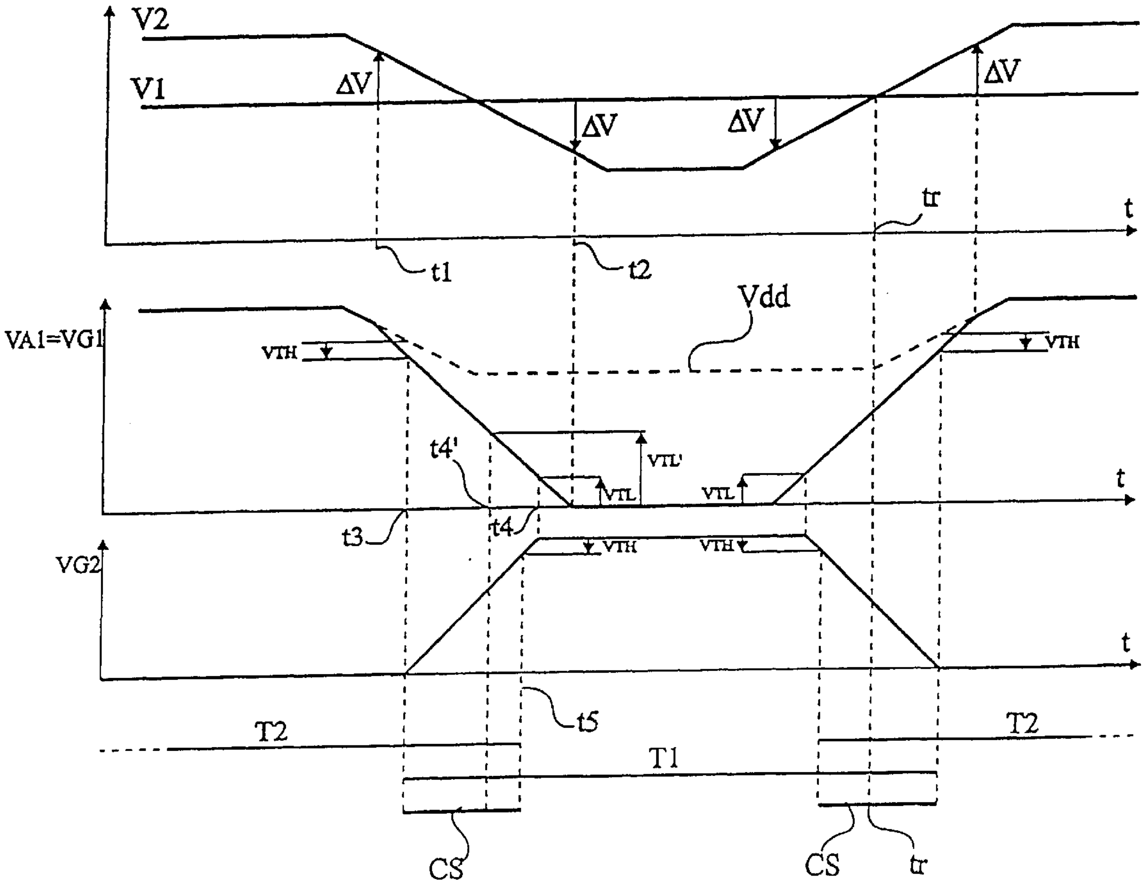
FIG. 2, previously described, illustrates the operation of the circuit of FIG. 1.

It is certified that error appears in the above-identified patent and that said Letters Patent is hereby corrected as shown below:

Column 1,
Lines 30 and 31, should read -- FIG. 2A shows the variation of gate voltages VG1 and VG2 of transistors T1 and T2 for an example of relative --

Column 6,
Line 3, should read -- the fifth transistor has a W/L ratio of 3/50. --

Signed and Sealed this

Twenty-sixth Day of August, 2003

JAMES E. ROGAN
*Director of the United States Patent and Trademark Office*